(12) United States Patent
Samaraweera

(10) Patent No.: US 10,289,112 B2
(45) Date of Patent: *May 14, 2019

(54) METHOD AND SYSTEM FOR POSITIONING A TRUCK FOR LOADING

(71) Applicant: CATERPILLAR INC., Peoria, IL (US)

(72) Inventor: Jagath R. Samaraweera, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/381,315

(22) Filed: Dec. 16, 2016

(65) Prior Publication Data
US 2018/0173221 A1 Jun. 21, 2018

(51) Int. Cl.
*G05D 1/00* (2006.01)
*G05D 1/02* (2006.01)
*G01C 21/00* (2006.01)

(52) U.S. Cl.
CPC .......... *G05D 1/0027* (2013.01); *G01C 21/00* (2013.01); *G05D 1/0217* (2013.01); *G05D 1/0291* (2013.01); *G05D 2201/0202* (2013.01)

(58) Field of Classification Search
CPC .. G05D 1/0027; G05D 1/0044; G05D 1/0276; G05D 1/0291; G05D 2201/0202; G05D 1/0212; G05D 1/0225; G05D 1/0287; G01C 21/3667; G01C 21/34; G01C 21/365; G01C 21/005; G01C 21/20

USPC ............... 701/2, 50, 431, 435, 456; 340/456
See application file for complete search history.

(56) References Cited

U.S. PATENT DOCUMENTS

| | | | |
|---|---|---|---|
| 8,583,361 B2 | 11/2013 | Lewis et al. | |
| 8,812,198 B1* | 8/2014 | Liu | E02F 9/2045 701/50 |
| 8,862,390 B2 | 10/2014 | Sugawara et al. | |
| 8,868,302 B2 | 10/2014 | Everett et al. | |
| 8,880,334 B2 | 11/2014 | Kini et al. | |
| 9,131,119 B2 | 9/2015 | Fiend et al. | |
| 2012/0290178 A1* | 11/2012 | Suzuki | E02F 9/2045 701/50 |
| 2014/0058668 A1* | 2/2014 | Trombley | G01C 21/20 701/523 |

FOREIGN PATENT DOCUMENTS

WO WO 2014/119711 A1 7/2014

\* cited by examiner

*Primary Examiner* — Bao Long T Nguyen
(74) *Attorney, Agent, or Firm* — Finnegan, Henderson, Farabow, Garrett & Dunner, LLP

(57) ABSTRACT

A method for positioning a truck for loading by a loading machine includes setting a loading spot location by the loading machine via a truck spotting system. The loading spot location is broadcast to trucks within a broadcast range. The loading spot location is displayed only to a truck that is in reverse gear.

19 Claims, 4 Drawing Sheets

METHOD AND SYSTEM FOR POSITIONING A TRUCK FOR LOADING

TECHNICAL FIELD

The present disclosure relates generally to truck loading and, more particularly, to a method and system for positioning a truck for loading.

BACKGROUND

Haulage machines, e.g., trucks, are used in connection with work sites, such as excavations, surface mines, and construction projects, to receive loads from a loading machine, such as an excavating or mining machine, and then transport those loads to another location. For example, one or more machines such as hydraulic excavators (HEX), wheeled or tracked loaders, electric rope shovels (ERS), etc., may be employed at a work site to excavate or remove material. A plurality of trucks, for example a fleet of trucks, may be used to transport the material away from the area being mined or excavated. Trucks may move to the area, for example along one or more haul roads, and they may queue up and sequentially move into position to receive a load from the excavating or mining machine.

Often the loading machine that is excavating or removing material may remain at the same location, or substantially so, while nominally repositioning itself to load a truck that has moved into position to receive a load from the machine. The excavation may develop somewhat gradually while trucks move to the work site, sequentially receive loads from the loading machine, and move away from the work site to transport the load. Optimally, one truck should be ready to move into position to receive a load as soon as another truck has moved away with its load and the machine is ready to deposit another load. At times, particularly at a large excavation site or mining operation, multiple machines may be operating to remove material while a substantial fleet of trucks operates to receive material from them and haul it away.

When locating or spotting a truck near a loading machine, the most common way for a loading machine operator to signal a truck operator when to reverse into position to receive a load of material is referred to as a "hanging bucket." The truck operator uses the hanging bucket as a guide to maneuver the truck to the correct position. The truck operator must take great care to move the truck to the correct position and orientation so that the loading machine operator can efficiently load the truck and position the material in the bed correctly.

Careful movement to the correct position also is desirable in order to avoid spillage and to avoid accidents such as collision with the bucket or another part of the excavator and/or with another truck that may be maneuvering to receive a load. Many of the haulage machines (i.e., trucks) employed at large mining/excavating sites are very large and difficult to maneuver, particularly when moving in reverse to a precise location. While an ERS can move the shovel forward or aft of the truck to some degree if the truck is not precisely positioned, precision is more necessary with a HEX since movement of the boom, stick, and bucket are more limited. Where the loading machine operator cannot load efficiently or position the material in the bed properly, the loading machine may request that the truck operator reposition the truck. Repositioning a truck in a mining operation is undesirable since it wastes time.

Where a truck operator requires multiple attempts to properly locate the truck at the optimum loading spot location, both time and fuel may be wasted during a renewed effort to maneuver to the correct location. Repositioning the excavator relative to the truck is generally a much slower, more impractical, and more dangerous procedure. It would be both beneficial and desirable to improve efficiency in the process of loading trucks at work sites such as mines and excavations, for example. There is a need for improvement in the process of spotting or positioning trucks for loading and ensuring that sequential loading of multiple trucks occurs with optimum fuel and time efficiency and with minimal risk of accidents.

One truck loading system is disclosed in U.S. Pat. No. 8,862,390 issued to Sugawara, et al. on Oct. 14, 2014 ("the '390 patent"). The '390 patent discloses a system employing GPS whereby a target position image and an approach route leading to a loading position adjacent an excavator are displayed on a dump truck display when the truck approaches the loading position. A current position image advances along the approach route to the target position image, and the truck is moved into the loading image target position. The '390 patent discloses that the excavator sends a request for movement to the loading position to all dump trucks, but priority is given to the one dump truck closest to the excavator, or to the dump truck with a driver having a high level of skill.

The truck loading system of the '390 patent may enhance loading operations at a work site to some extent, but there remains room for improving loading and material transporting efficiency. While the '390 patent discloses giving priority to either the dump truck closest to the excavator, or to the dump truck with a highly skilled driver, this may not be enough to ensure optimum efficiency. Where multiple loading positions are possible, for example plural excavators that are closely situated or excavators positioned to load from either side of the excavator, simply choosing the truck closest or with a better driver does not consider the orientation of the truck. For example, given size and maneuverability, a closest truck may not be positioned and ready to quickly move into loading position. In addition, giving priority to the driver presumed to have a high level of skill may not adequately reduce risk of accidents.

The disclosed method and system for positioning a truck for loading is directed to overcoming one or more of the problems set forth above.

SUMMARY

According to one exemplary aspect, the present disclosure is directed to a method for positioning a truck for loading by a loading machine. The method may include setting a loading spot location by the loading machine via a truck spotting system The method also may include broadcasting the loading spot location to trucks within a broadcast range. The method also may include displaying the loading spot location only to a truck that is in reverse gear.

According to another exemplary aspect, the present disclosure is directed to a method for positioning a truck for loading by one of a plurality of loading machine working in close proximity. The method may include setting loading spot locations by both a first and a second loading machine of the plurality of loading machines via a truck spotting system. The method also may include broadcasting by both the first and the second loading machines the loading spot locations to trucks within a broadcast range of both the first and the second loading machines. The method also may include displaying one of the loading spot locations only to a truck that is in reverse gear.

According to yet another exemplary aspect, the present disclosure is directed to a system for determining the loading spot location for a haulage machine and including at least one loading machine and a plurality of haulage machines. The system may include at least one loading machine configured to be capable of depositing a load at multiple loading spot locations and configured to broadcast signals indicative of at least two loading spot locations. The system also may include a plurality of haulage machines. Each haulage machine may be configured to receive the signals indicative of the at least two loading spot locations when within a broadcast range of the signals. The haulage machine also may be configured to measure the distance to the at least two loading spot locations. The haulage machines also may be configured to determine the closest of the at least two loading spot locations. The system may be configured to provide directions to the closest loading spot location only to a haulage machine that is in a reverse gear.

DETAILED DESCRIPTION

Figure 1:
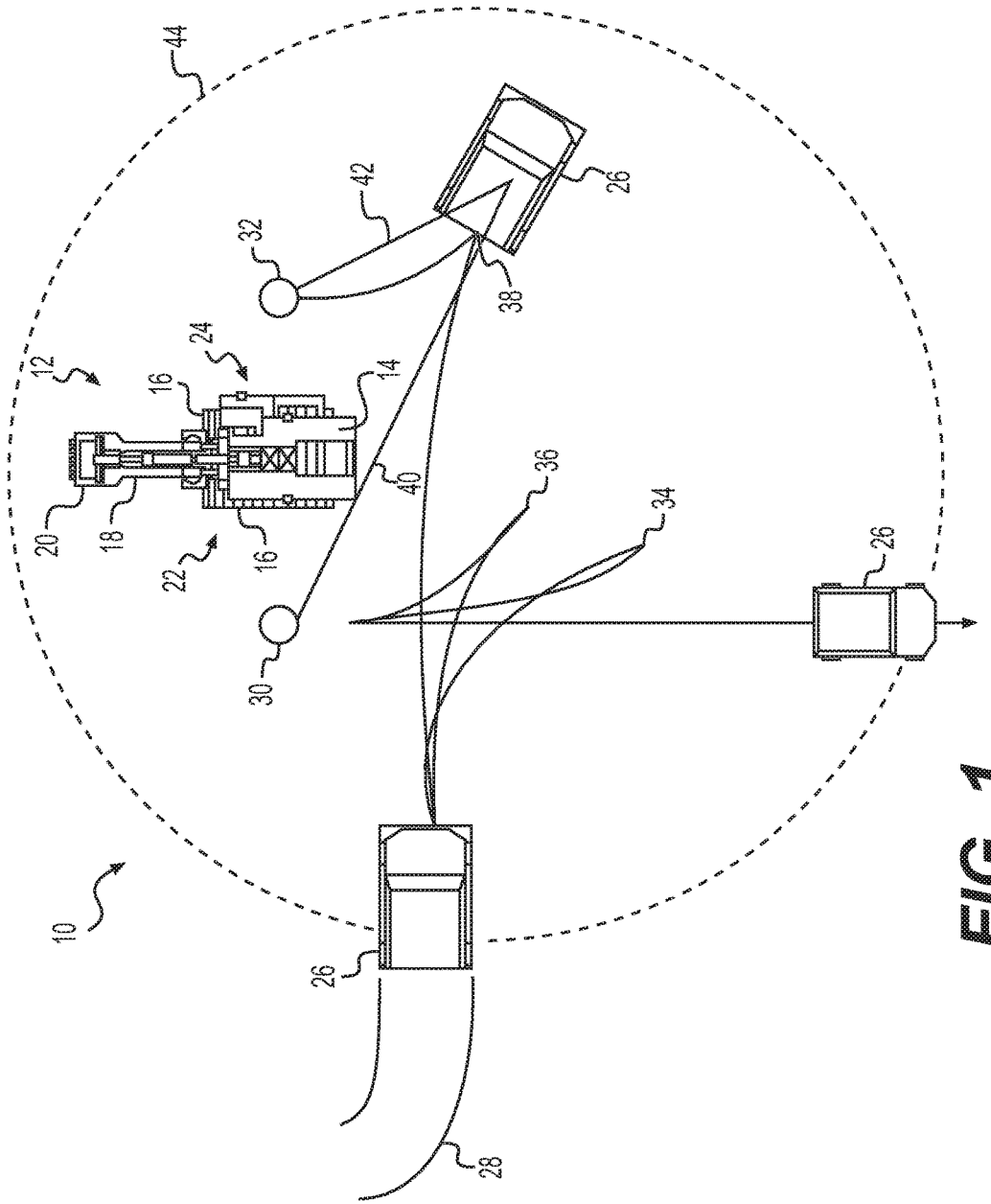
FIG. 1 is a diagrammatic illustration of an exemplary truck spotting method and system involving a loading machine capable of loading at plural loading spot locations.

FIG. 1 illustrates a worksite 10. Worksite 10 may be any of various types of worksites where material is being removed and transported away from the immediate area where it is being removed. For example, worksite 10 may be a surface mining operation, a quarrying operation, a construction site, or any other endeavor where material is removed and transported. Worksite 10 may include a loading machine 12 capable of excavating or otherwise removing material from a surface, for example the surface on which loading machine 12 is supported or a face of an excavation, and then depositing a load of that material. Typically, loading machine 12 may be an electric rope shovel (ERS) or a hydraulic excavator (HEX). Loading machine 12 also may be a wheel-type loader, a tracked loader, a backhoe, or any other machine capable of removing material and then depositing a load of the removed material.

Loading machine 12 may include a superstructure 14 supported by ground supports 16, for example endless tracks. Superstructure 14 may support a linkage system 18 which may in turn support a tool 20, such as a bucket or shovel, capable of removing material, containing the removed material, and then depositing or dumping the removed material. Loading machine 12 may be capable of depositing a load of material at locations on opposite sides of loading machine 12. As viewed in FIG. 1, one side of loading machine 12 is designated left side 22, and the opposite side of loading machine 12 is designated right side 24. Loading machine 12 may be capable of movement so as to reorient tool 20 from its load gathering position to positions for depositing a load at the left side 22 or at the right side 24 of loading machine 12. Reorientation of tool 20 may be by way of superstructure 14 being capable of swinging or pivoting relative to ground supports 16, for example.

Typically, one or more haulage machines, for example trucks 26, may be employed at worksite 10 for receiving material excavated or removed by loading machine 12 and transporting the material to another location. For example, in a surface mining or quarrying operation, trucks 26 may transport loads received from loading machine 12 to one or more crushers. Loads also may be transported to another location, for example a nearby or remote dumpsite. The number of trucks 26 that may be employed at worksite 10 may vary substantially, depending on the size of the operation. For example, in a large operation, a fleet of trucks 26 may be required to transport the removed material.

During operation at worksite 10, some trucks will be in the process of transporting a load that has been received, while other trucks will be returning to worksite 10 and queuing up to maneuver into position to receive a load from loading machine 12. As a truck 26 approaches the general location of loading machine 12, for example along one or more haul roads such as haul road 28, truck 26 may not yet know the precise location at which a load will be deposited by loading machine 12. For example, loading machine 12 may deposit a load at a loading spot location 30 at left side 22, or at loading spot location 32 at right side 24.

Currently, as truck 26 moves to a cusp location 34, a cusp location 36, or a cusp location 38, for example, in anticipation of shifting to reverse and backing to a loading spot location 30 or 32 to receive a load, the truck operator may then know which side of loading machine 12 he or she may need to be on. This may have been communicated to the truck operator via the "hanging bucket" technique or by direct communication between the truck operator and the loading machine operator. Where there is no communication indicating the side of loading machine 12 for truck 26 to be on, the truck operator may simply make a guess which side to position on.

The disclosed truck spotting system may more reliably inform the truck operator which side of a loading machine 12 to position truck 26 on and the correct orientation for the truck 26 relative to loading machine 12. This may eliminate the need for the hanging bucket technique or other conventional communication. The disclosed truck spotting system will assign and display the closest spot point and project the path to that spot point. Ordinarily, the truck operator should be able to perceive the closest spot point, but the truck spotting system will make sure the correct spot point is assigned and displayed with a reverse path, based on the measured distance to it, if there are multiple broadcast spot points. Loading machine 12, in accordance with disclosed embodiments to be further described subsequently, may broadcast information regarding potential loading spot locations via any conventional broadcasting technology within a broadcast range 44, and trucks 26 within broadcast range 44 may receive that information.

Figure 2:
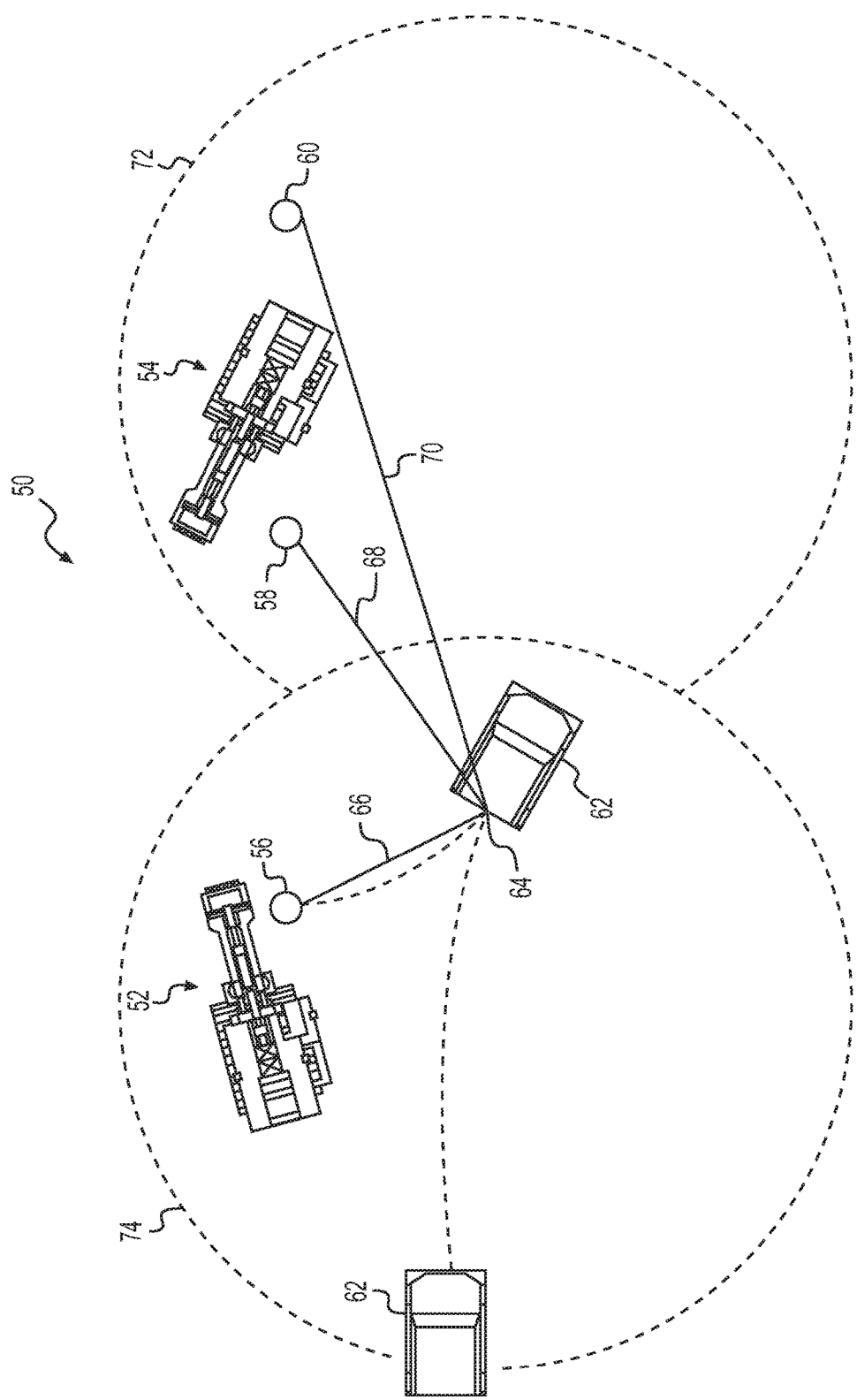
FIG. 2 is a diagrammatic illustration of an exemplary truck spotting method and system involving multiple loading machines capable of loading at multiple loading spot locations.

While FIG. 1 illustrates a worksite 10 involving a single loading machine 12 capable of depositing a load at multiple locations, FIG. 2 illustrates a worksite 50 and an operation where a plurality of loading machines 52 and 54 work in close proximity. Like loading machine 12, loading machines 52 and 54 may be any type of machine capable of excavating or otherwise removing material and then depositing a load of that material (e.g., a hydraulic excavator, an ERS, etc.). Each loading machine 52, 54 may be capable of depositing a load at plural locations, such as loading spot locations 56, 58, and 60, for example. While three loading spot locations are illustrated in FIG. 2, it will be understood that it is contemplated that loading machines 52, 54 may be variously oriented relative to each other, and that loading machine 52, like loading machine 54, may be capable of depositing a load on its opposite sides. In addition, scenarios are contemplated with more than two loading machines working in close proximity and capable of depositing a load at opposite sides of the machine.

Trucks 62, for example a fleet of trucks, may approach work site 50 and the general location where loading machines 52 and 54 are working in order to receive a load from one of loading machine 52 and 54 in a manner similar to that described in connection with worksite 10 and FIG. 1. Some trucks will be in the process of transporting a load that has been received, while other trucks will be returning to worksite 50 and queuing up to maneuver into position to receive a load from one of loading machines 52 and 54.

As a truck 62 moves to a cusp location 64, for example, in anticipation of shifting to reverse and backing to a loading spot location 56, 58, or 60 to receive a load, truck 62 may not yet know either the loading machine from which it will receive a load, or the precise location at which a load will be deposited. For example, the distances 66, 68, and 70 may be unknown. Loading machines 52 and 54, in accordance with disclosed embodiments to be further described subsequently, may broadcast information regarding potential loading spot locations via any conventional broadcasting technology within broadcast ranges 72 and 74, for example, and any trucks 62 within broadcast ranges 72, 74 may receive that information. It should be understood that the broadcast ranges 72, 74 in FIG. 2 are illustrative only, and that actual broadcast ranges may vary and overlap substantially. It is contemplated that loading machine 52, 54, working in close proximity may have broadcast ranges that overlap considerable more than that schematically shown in FIG. 2 so that trucks 62 approaching the vicinity of the loading machine will be capable of receiving information from both machines.

Figure 3:
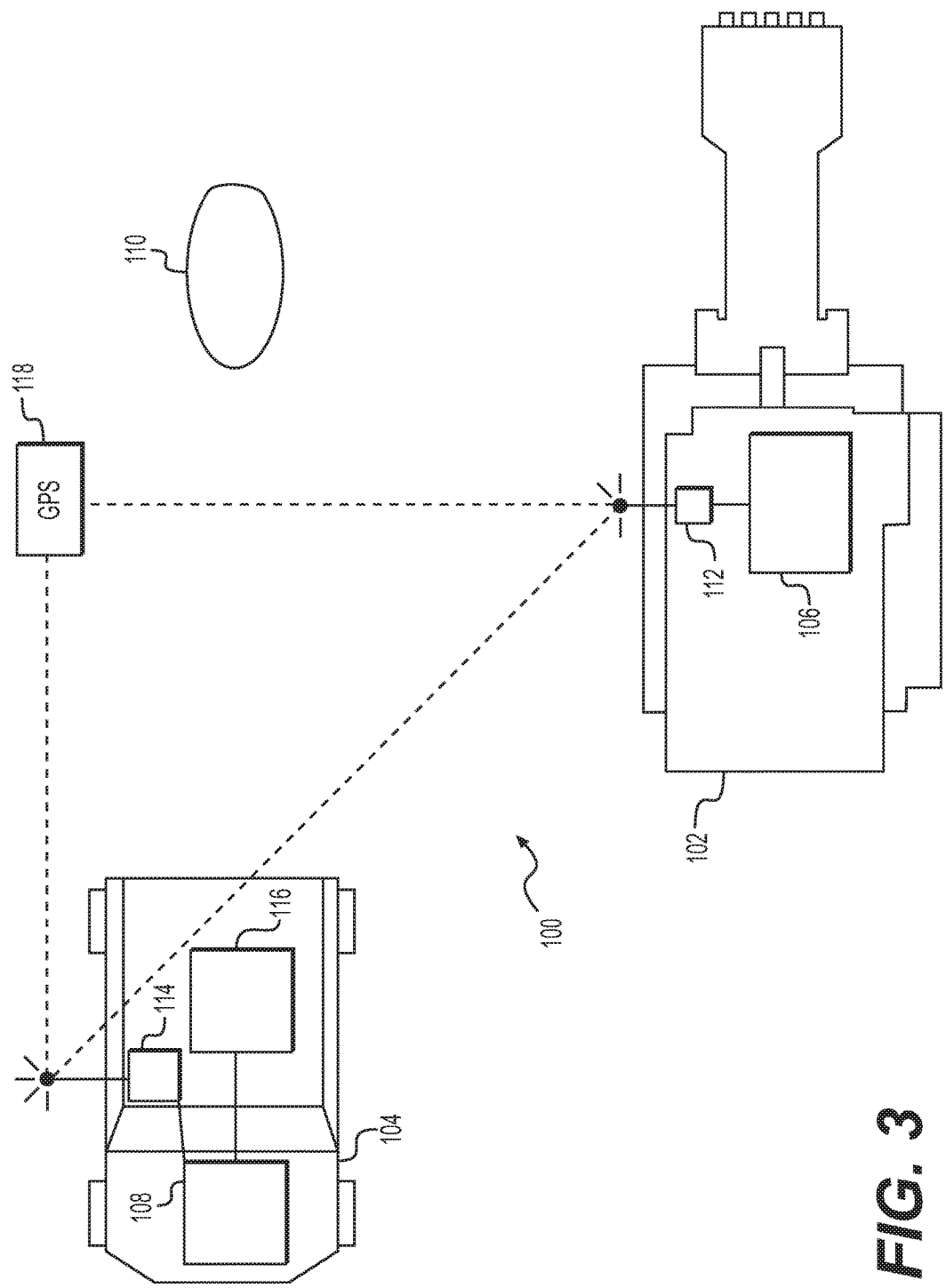
FIG. 3 is a diagrammatic illustration of a truck spotting system.

FIG. 3 is a diagrammatic illustration of features of a truck spotting system 100. In FIG. 3, a single loading machine 102 and a truck 104 to be loaded are schematically illustrated, but it will be understood that truck spotting system 100 is applicable to scenarios involving one loading machine (see, e.g., FIG. 1) or multiple loading machines (see, e.g., FIG. 2). It is contemplated that a fleet of trucks 104 may sequentially arrive at a worksite to receive a load, for example along one or more haul roads. Loading machine 102 may include a controller 106, for example a microprocessor capable of running one or more applications, storing data, and retrieving data. In addition to being capable of controlling various loading machine systems, controller 106 may be configured to perform functions of the disclosed truck spotting system 100. Truck 104 may include a controller 108, for example a microprocessor similar to that described for loading machine 102. Controller 108 may be configured to perform functions of the disclosed truck spotting system 100, and also may be capable of controlling various systems of truck 104.

Loading machine 102 may retrieve a load of material in the normal course of operation and make a decision, e.g. via the loading machine operator and controller 106, to deposit the load at a loading spot location, e.g., loading spot location 110. Controller 106 may, via transmitting device 112, broadcast signals indicative of the position of the selected loading spot location 110. The broadcast frequency may vary, but may be selected so as to broadcast the signals over a broadcast range that may cover an area in which several trucks 104 are currently located, either returning to the worksite for a load, maneuvering into position to receive a load, or leaving the worksite with a load. For example only, the broadcast range may have a radius on the order of 100 meters, more or less.

The signals indicative of the position of the selected loading spot location 110 may be received by all trucks within the broadcast range, for example by truck 104 via receiving device 114, and processed by controller 108. Truck 104 also may include a display device 116 configured to display to an operator of truck 104 visual information including, among other things, the loading spot location 110 indicated by signals received by receiving device 114. However, although the signals may be received, the loading spot location 110 will not necessarily be displayed to all trucks that receive the signals.

In accordance with disclosed embodiments, in order for the loading spot location 110 to appear on display device 116, truck 104 must be in a reverse gear. For example, truck 104, upon arriving at the worksite and in the general area of operation of loading machine 102, may maneuver forward to a cusp location (see, e.g., FIG. 1) where forward motion may cease, and engage a reverse gear in preparation for maneuvering in reverse to the loading spot location 110. At this cusp location where forward truck movement has ceased and the truck has just shifted into reverse gear, controller 108 may initiate display of the loading spot location 110.

As disclosed in the description of FIG. 1, a loading machine may deposit a load at more than one loading spot location. Accordingly, loading machine 102 may, e.g. via the loading machine operator and controller 106, designate a potential loading spot location 110 at one side of loading machine 102, and designate a second potential loading spot location at the other side of loading machine 102 (see, e.g., FIG. 1). In such a scenario, controller 108 associated with truck 104 may, e.g., via GPS 118 location or any other conventional distance measuring technology, measure the distance to each potential loading spot location designated by loading machine 102. Controller 108 may determine the closest of the two designated potential loading spot locations. Once truck 104 then maneuvers to a cusp location and shifts into a reverse gear, controller 108 may initiate display of the closest loading spot location on display device 116.

Display device 116 also may display a closest path to the loading spot location. Accordingly, an operator of truck 104 may be apprised of directions to the loading spot location that include the closest loading spot location (e.g., loading spot location 110 in FIG. 3), and the closest path for reverse movement of truck 104 to that loading spot location. The directions may include a visual representation of the reverse path that truck 104 may follow until arrival at loading spot location 110.

It is contemplated that situations may arise whereby a truck operator may find it undesirable to accept the loading spot location that has been displayed. Such a situation may include where there are multiple loading machines close enough that the truck operator considers it more prudent to receive a load at a different loading machine. Another such situation may be where there is an issue with the displayed loading spot location such as an obstacle that the truck operator either should or would rather avoid. Accordingly, a truck operator may, for any desired reason, choose not to accept the displayed loading spot location, and instead, override the displayed loading spot location and select a different loading spot location. The operator choosing to override the displayed loading spot location may prudently notify the affected loading machine. Truck 104 may then proceed to the selected different loading spot location without displayed directions. Alternatively, via communication between controllers 106 and 108, display of the newly selected loading spot location and associated reverse path may appear on display device 116.

While the description of FIG. 3 has referred to an operation involving as single loading machine 102, truck spotting system 100 may involve multiple loading machines. Where two or more loading machines operate in close proximity, each loading machine being capable of depositing a load at more than one loading spot location, truck spotting system 100 operates in a manner similar to that described above in connection with the scenario where one loading machine 102 is involved. Differences may be in the number of possible loading spot locations and in that trucks 104 may be within the broadcast range of more than one loading machine 102. Referring back to FIG. 2, a truck 104 may measure the distance to each loading spot location, with the closest loading spot location and the closest path for truck 104 to move to that loading spot location then displayed on display device 116 once truck 104 has shifting into a reverse gear.

It should be apparent that where multiple loading spot locations and/or multiple loading machines are involved, plural trucks may be maneuvering into position to receive a load. For example, trucks may arrive at the general location of the loading machine(s) via different paths or haul roads, and more than one truck may begin to maneuver to a cusp location at about the same time. In such a situation, display of a closest loading spot location and reverse path to that location will be displayed to the first truck to shift into a reverse gear. A different loading spot location and reverse path will be assigned to and displayed for the next truck to shift into a reverse gear.

Figure 4:
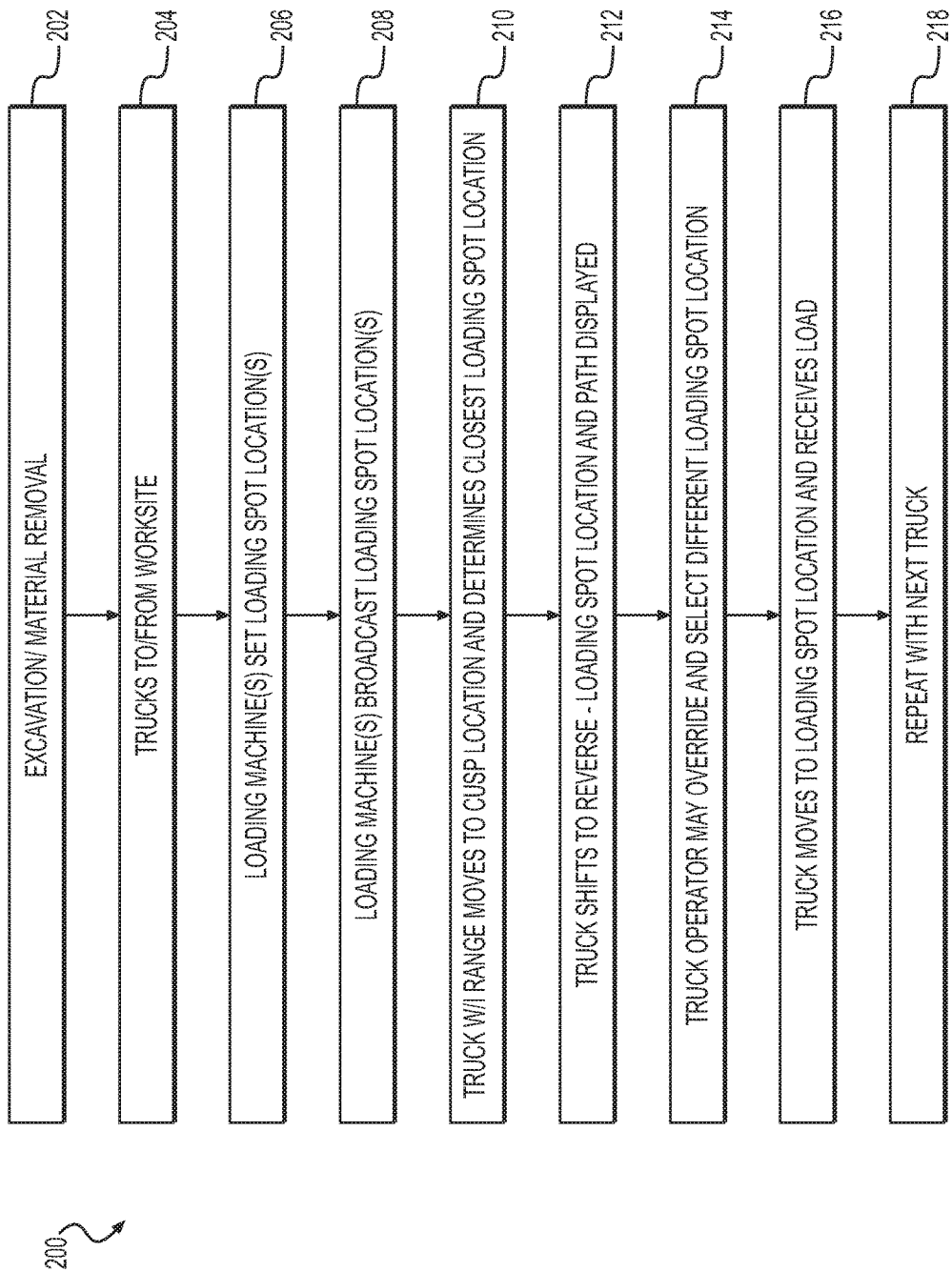
FIG. 4 is a flow diagram of an exemplary method according to the disclosure.

FIG. 4 illustrates a flow chart 200 of an exemplary method according to disclosed embodiments. At step 202, excavation and/or material removal may be proceeding at a worksite via one or more loading machines as described in connection with FIGS. 1, 2, and 3. Here, the loading machine manipulates a tool, for example a bucket or shovel capable of holding a quantity of material, to engage the material to be removed and fill the tool with material in preparation for moving the tool to a loading spot location. The loading machine(s) may be equipped with a controller and a transmitter (see, e.g., the description of FIG. 3) configured to transmit signals indicative of one or more loading spot locations.

In the meantime, at step 204, a fleet of trucks/haulage machines may be moving to the worksite to receive a load of material and from the worksite to deliver loads to another location. The trucks may queue up or otherwise sequentially position themselves in preparation for movement to a loading spot location. Each truck may be equipped with a controller and a receiver (see, e.g., the description of FIG. 3) configured to receive signals transmitted from the loading machine(s). The controller may be configured to measure the distance to each loading spot location and determine the loading spot location that is closest to the truck (e.g., via a system such as GPS or any other conventional distance measuring system). The trucks also may be equipped with suitable displays configured to display visual information representing the set loading spot location(s).

At step 206, the loading machine(s) may set one or more loading spot locations via the truck spotting system. Here, a loading machine operator may, via the controller on-board the loading machine, determine one loading spot location, for example at a left side of the loading machine, or determine two possible loading spot locations, for example with one being on a left side of the loading machine and another being on a right side of the loading machine. Where there are two loading machines, each loading machine may set two or more possible loading spot locations. It is contemplated that in some situations, more than two loading machines may be working in close proximity with each loading machine setting one, two, or more loading spot locations.

At step 208, the loading machine(s) may broadcast the loading spot location(s) that have been set to trucks that are within the broadcast range. The broadcast range may vary depending on the broadcast frequency used (see, e.g., the broadcast range 44 of FIG. 1 and the broadcast ranges 72, 74 of FIG. 2). All trucks within the broadcast range may receive the signals indicative of loading spot locations transmitted from the loading machine(s). However, while a truck within the broadcast range may receive the signals, information represented by the signals is not initially displayed except under conditions to be subsequently described.

At step 210, a truck within the broadcast range may be in position to prepare to move to a loading spot location. A truck may move forward toward a cusp location at which forward motion may cease in preparation for movement to a loading spot location. The truck controller may initiate measurement of the distance to received loading spot locations and determine the closest loading spot location.

At step 212, the truck may shift into a reverse gear in preparation for backing into a loading spot location. As the truck reaches the cusp location and has just shifted into reverse, the controller on the truck may initiate display of the loading spot location that has been determined to be closest and present a visual representation of the set loading spot location that is closest to the truck. In addition, the display may present a visual representation of the closest path to the selected loading spot location.

At step 214, where the truck operator determines in a particular instance that a different loading spot location is desirable, the truck operator may override the displayed closest loading spot location and closest path and select a different loading spot location. Concomitantly, the truck operator may, via communication between the truck controller and the loading machine controller, notify the loading machine of the override and elect initiation of a display of the newly selected loading spot location and the shortest path to that location.

At step 216, the truck may move into position to receive a load from the loading machine and the loading machine may load the truck which subsequently may transport the load to a designated site. At step 218, the sequence may be repeated with the next truck that has shifting into a reverse gear.

INDUSTRIAL APPLICABILITY

Disclosed embodiments of the system and method for positioning a truck for loading may be applicable to any worksite where one or more loading machines operate to remove material and load trucks with the removed material. The disclosed system and method may be implemented with any type of loading machine (e.g., HEX, ERS, etc.) and any type of truck or haulage machine.

With the disclosed system and method, the normal need for a fleet production system to determine assignment of loading spots to the various trucks in a queue may be avoided. With the disclosed system and method, a truck may know its assigned loading spot location when the truck has moved to a cusp position and shifted to a reverse gear. When the truck has shifted into a reverse gear, a display within the truck reveals the assigned loading spot location and the closest reverse path to that loading spot location giving more certainty for the truck operator and less risk that there may be impacts between trucks or between a truck and a loading machine.

On some worksites, for example on a large worksite where multiple loading machines are operating in general proximity to one another and multiple trucks may be maneuvering to back to one of several loading spot locations, embodiments under the present disclosure ensure that only when a truck has maneuvered to a cusp location and shifting into a reverse gear will the assigned loading spot location and reverse path to it be displayed. Not only will this give trucks a clear indication of a target loading spot location and path to it, but also it may prevent potentially catastrophic accidents involving multiple trucks and a loading machine.

It will be apparent to those skilled in the art that various modifications and variations can be made to the disclosed method and system for positioning a truck for loading. Other embodiments will be apparent to those skilled in the art from consideration of the specification and practice using the disclosed method and system for positioning a truck for loading. It is intended that the specification and examples be considered as exemplary only, with a true scope being indicated by the following claims and their equivalents.

What is claimed is:

1. A method for positioning a truck for loading by a loading machine, comprising:
    setting a loading spot location by the loading machine via a truck spotting system;
    broadcasting the loading spot location to trucks within a broadcast range; and
    displaying the loading spot location only to a truck that is in reverse gear, wherein displaying the loading spot location only to a truck that is in reverse gear includes initiating displaying when the truck is in a cusp location where forward truck movement has ceased and the truck has just shifted into reverse gear.

2. The method of claim 1, including:
    also displaying a guided path to the loading spot location to the truck that is in reverse gear.

3. The method of claim 2, wherein the loading machine is configured to load at either a first loading spot location on a first side of the loading machine, or at a second loading spot location on a second side of the loading machine, further including:
    broadcasting the first loading spot location and the second loading spot location to trucks within the broadcast range; and
    displaying the guided path to only the loading spot location that is closest to the truck that is in reverse gear.

4. The method of claim 3, wherein the loading machine is a first loading machine, and further including a second loading machine working in close proximity to the first loading machine, the method further including:
    setting loading spot locations by both the first and the second loading machines via the truck spotting system;
    broadcasting the loading spot locations from both the first and the second loading machines to trucks within the broadcast range; and
    displaying one of the loading spot locations only to a truck that is in reverse gear.

5. The method of claim 4, including measuring the distance from the truck to each loading spot location set by both the first and the second loading machines via the truck spotting system, and displaying the closet loading spot location to the truck that is in reverse gear.

6. The method of claim 5, further including overriding, by an operator of the truck to which the loading spot location and guided path have been displayed, the displayed loading spot location and selecting a different loading spot location.

7. The method of claim 2, including:
    overriding, by an operator of the truck to which the loading spot location and guided path have been displayed, the displayed loading spot location;
    selecting a different loading spot location; and
    displaying the different loading spot location and a reverse path to the different loading spot location.

8. The method of claim 1, wherein the loading machine is one of an electric rope shovel or a hydraulic excavator.

9. A method for positioning a truck for loading by one of a plurality of loading machine working in close proximity, comprising:
    setting loading spot locations by both a first and a second loading machine of the plurality of loading machines via a truck spotting system;
    broadcasting by both the first and the second loading machines the loading spot locations to trucks within a broadcast range of both the first and the second loading machines; and
    displaying one of the loading spot locations only to a truck that is in reverse gear, wherein displaying the loading spot location only to a truck that is in reverse gear includes initiating displaying when the truck is in a cusp location where forward truck movement has ceased and the truck has just shifted into reverse gear.

10. The method of claim 9, wherein displaying one of the loading spot locations includes displaying the loading spot location that is closest to the truck that is in reverse gear.

11. The method of claim 10, further including also displaying the closest guided reverse path for the truck to the loading spot location.

12. The method of claim 9 wherein the first loading machine is configured to load at a first loading spot location on one side of the first loading machine, and load at a second loading spot location on a second side of the first loading machine, and wherein the second loading machine is configured to load at a third loading spot location on one side of the second loading machine, and load at a fourth loading spot location on a second side of the second loading machine, further including:
    measuring the distance from the truck to each of the first, second, third, and fourth loading spot locations.

13. The method of claim 12, wherein displaying one of the loading spot locations only to a truck that is in reverse gear includes displaying the closest of the first, second, third, and fourth loading spot locations to the truck.

14. The method of claim 13, further including displaying a guided path to the closest of the first, second, third, and fourth loading spot locations to the truck.

15. The method of claim 13, including overriding the displayed loading spot location, by an operator of the truck to which the loading spot location has been displayed, and selecting, by the operator, a different loading spot location.

16. A system for determining the loading spot location for a haulage machine and including at least one loading machine and a plurality of haulage machines, the system comprising:

at least one loading machine configured to deposit a load at multiple loading spot locations and configured to broadcast signals indicative of at least two loading spot locations; and a plurality of haulage machines each configured to:

receive the signals indicative of the at least two loading spot locations when within a broadcast range of the signals;

measure the distance to the at least two loading spot locations;

determine the closest of the at least two loading spot locations; and wherein the system is configured to provide directions to the closest loading spot location only to a haulage machine that is in a reverse gear, wherein providing directions to the closest loading spot location only to a haulage machine that is in reverse gear includes initiating providing directions when the haulage machine is in a cusp location where forward movement of the haulage machine has ceased and the haulage machine has just shifted into reverse gear.

17. The system of claim 16, wherein only a haulage machine that is in a reverse gear is configured to display the directions on a display screen in an operator station on the haulage machine, and wherein the directions include the loading spot location and a closest path to the loading spot location.

18. The system of claim 16, wherein the at least one loading machine includes at least two loading machines working in close proximity and configured to deposit a load at multiple loading spot locations, each machine being configured to broadcast signals indicative of at least two loading spot locations.

19. The system of claim 18, wherein only a haulage machine that is in reverse gear is configured to display the directions on a display screen in an operator station on the haulage machine, and wherein the directions include the loading spot location and a closest path to the loading spot location.

* * * * *